United States Patent [19]

Burger

[11] 4,156,045
[45] May 22, 1979

[54] COMPOSITE ELASTIC PADDING STRUCTURE

[75] Inventor: Frédéric Burger, Meru, France

[73] Assignee: Allibert Exploitation, Grenoble, France

[21] Appl. No.: 302,535

[22] Filed: Oct. 31, 1972

[30] Foreign Application Priority Data

Nov. 3, 1971 [FR] France ................................ 71.40031

[51] Int. Cl.² .............................................. B60K 37/00
[52] U.S. Cl. ...................................... 428/160; 180/90;
428/71; 428/172; 428/174; 428/177; 428/322
[58] Field of Search .................. 161/69, 161, 160, 43,
161/123; 180/90; 296/70, 137 R; 156/78, 79;
264/45; 52/334, 309, 425; 428/71, 158, 159,
160, 174, 177, 320, 321, 322, 172

[56] References Cited

U.S. PATENT DOCUMENTS

| | | | |
|---|---|---|---|
| 2,987,855 | 6/1961 | Singleton et al. ..................... 52/334 |
| 3,043,730 | 7/1962 | Adie ................................. 161/161 X |
| 3,256,131 | 6/1966 | Koch et al. ....................... 161/161 X |
| 3,385,015 | 5/1968 | Hadley ................................. 52/334 |
| 3,511,738 | 5/1970 | McGuire ................................ 264/45 |
| 3,516,675 | 6/1970 | Kuester et al. .................. 161/161 X |
| 3,518,801 | 7/1970 | Redey ................................... 52/309 |
| 3,533,896 | 10/1970 | Hartig ................................ 161/69 X |
| 3,583,123 | 6/1971 | Holmgren ........................ 161/161 X |
| 3,640,796 | 2/1972 | Cotelle ............................. 161/161 X |
| 3,758,370 | 9/1973 | Sakurai et al. ......................... 161/69 |

Primary Examiner—Stanley S. Silverman
Attorney, Agent, or Firm—Karl F. Ross

[57] ABSTRACT

This elastic composite assembly intended especially for upholstering or lining instrument panels or inner walls of passenger compartments of motor vehicles comprises at least one rigid support, a cellular padding and a covering plastic sheet, the sheet being formed integrally with a great number of studs on its inner face so as to constitute an equal number of anchoring points for the sheet in said padding, the padding consisting preferably of polyurethane and the rigid support of metal or molded plastic.

1 Claim, 3 Drawing Figures

COMPOSITE ELASTIC PADDING STRUCTURE

BACKGROUND OF THE INVENTIN:

This invention relates to padding structures in general and has specific reference to resilient padding structures for automotive use.

1. Field of the Invention:

In many fields, especially automobile construction, there is an increased trend towards a general use of elements having elastic, shock-absorbing properties. Thus such elements are widely used for lining the passenger compartments of many types of motor vehicles, especially the instrument panel or facia board.

In the following disclosure the problem lying at the root of this invention and the solution proposed therefor will be set forth, for the sake of simplicity and clarity, with specific reference to an instrument panel of motor vehicle, but of course this choice should not be construed as limiting the scope of the invention, since the latter is applicable to many composite elements whether or not intended for the automotive industry.

2. Description of the Prior Art:

One-piece instrument panels of cellular plastic such as polyurethane are already known; they are obtained by using a molding process performed under such conditions that a "skin" builds up automatically on the outer surface of the instrument panel to constitute the visible portion thereof. This process is not only very delicate to carry out, but requires the use of very expensive molds of relatively short useful life, these molds being usually made from silicone materials.

To reduce the cost of these instrument panels an obvious solution seemed to be to substitute, for this skin formed integrally by molding with the instrument panel body, a plastic sheet, for example of PVC, independent of, but adhering to, this panel body. To this end, it was only necessary to cast the resin or resin mixture into a mold having its two registering faces lined respectively with the plastic sheet and with a rigid supporting element to be subsequently used as a support for the composite assembly.

However, even in this case drawbacks were found, in that the outer sheet and the inner padding or stuffing had different coefficients of thermal expansion, so that the bond between these elements was not sufficient and the sheet tended to become detached from the padding.

To avoid this unsatisfactory bond a known proposition consisted in forming ribs on the inner face of the plastic sheet, preferably in the form of a checkered pattern. However, better results were not achieved because these ribs acted as barriers counteracting the expulsion of air during the resin -injection operation, so that eventually air pockets developed along these ribs and proved highly detrimental to the bond between the outer sheet and the inner cellular padding.

With this history, it hardy seems to be possible, up to now, to make a composite unit comprising a rigid support, a cellular padding and a plastic sheet, with a bond between the cellular padding and the plastic sheet, sufficient to positively prevent the separation and tearing off of the plastic sheet.

This gap is actually filled up by the present. To overcome this problem, the present invention provides a composite unit or assembly comprising at least one rigid support, a cellular padding and a plastic sheet, this assembly being characterised in that the plastic sheet comprises on its back or inner face a large number of studs constituting as many anchoring means penetrating into the cellular padding and disposed with a relative spacing or pitch small enough to withstand tearing stresses caused by the differences in thermal expansion of the sheet and padding, and to distribute uniformly and proportionally, throughout the surface of the composite assembly, the dimensional variations due to the differences in shrinking and expansion of the component element of the assembly.

The aforesaid studs molded integrally with the plastic sheet, can have any desired configuration, provided that their resilience is sufficient to withstand the distortion resulting from the differences between the thermal expansions of the sheet and the cellular padding on which said sheet is caused to bear and react.

Of course, various materials may be used for making the three component elements of the composite unit of this invention. Thus, the resin support constituting the rigid or relatively rigid base of the assembly consist of metal or plastic material and the cellular padding advantageously consist of polyurethane. The plastic sheet and the studs formed integrally thereon may consist, preferably, of PVC.

The padding is prepared in situ in the mold, the two registering faces of this mold having been lined beforehand with the rigid support and with the plastic sheet respectively. This rigid support and this sheet are shaped beforehand in independent molds.

A clearer understanding of the present invention will be had from the following description with reference to the accompanying drawing.

Figure 1:
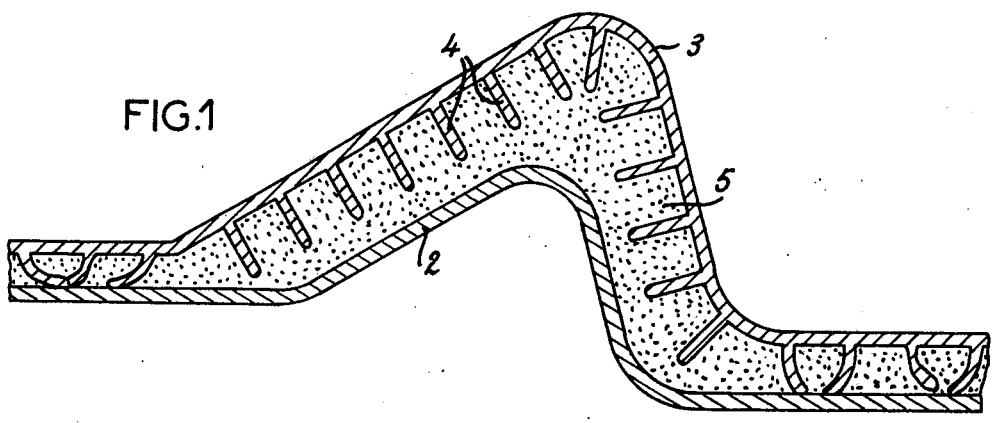
FIG. 1 is a section showing one portion of a unit according to the invention.
Figure 2:
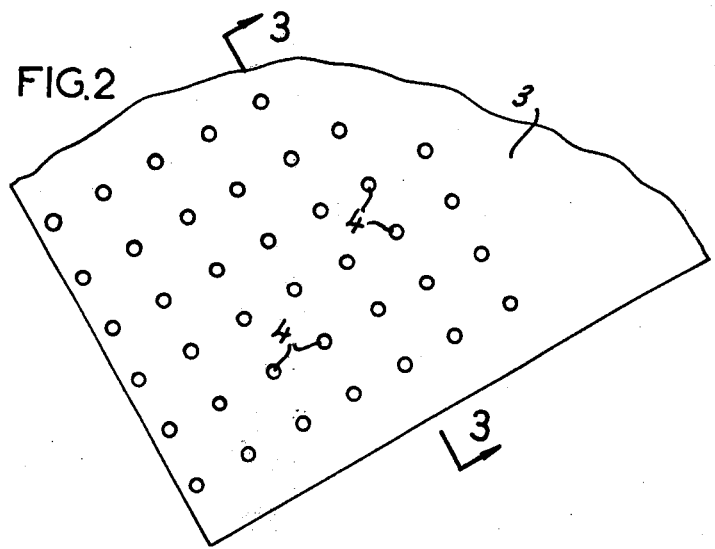
FIGS. 2 and 3 are an elevational view and a sectional view, respectively, of one portion of the plastic sheet, the section being taken along the line 3—3 of FIG. 2.
Figure 3:
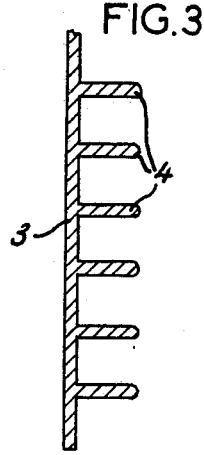

DESCRIPTION OF THE PREFERRED EMBODIMENT:

The unit illustrated in FIG. 1 comprises three component elements, namely:

a rigid support 2 consisting advantageously of molded plastic material;

a plastic sheet 3 consisting advantageously of polyvinyl chloride (PVC) and comprising on its back or inner face a relatively large number of discrete studs (or pins) 4 molded integrally therewith, and a cellular padding 5, consisting advantageously of polyurethane.

This composite unit 2, 3, 5 is obtained by molding in a mold into which the rigid support 2 and the plastic sheet 3 have previously been introduced and properly positioned. These elements 2 and 3 are applied to the two registering main faces of the mold and thus from therebetween a chamber into which the studs 4 project. The resin, or more particularly the resin mixture which is to constitute the polyurethane layer 5, is then cast into this chamber. As can be seen from the drawing the resiliently deflectable studs 4 have lengths greater than their thicknesses.

The presence of these studs 4 does not interfere with the introduction or casting of the resin, and the air can escape freely from the assembly during this casting operation, so that the studs are eventually embedded in the cellular padding 5 so as to constitute therein as many anchoring points for the PVC sheet 3. These anchoring points are very closely spaced so that the differences in the coefficients of expansion of the sheet 3 and padding 5 cannot cause the sheet 3 to separate from the padding 5, even if the composite unit were exposed to a relatively high temperature, as observed for instance in the case of an instrument panel of motor vehicle exposed to the sun within the passenger compartment. On the contrary, the studs 4, of which some remain rectilinear while others assume definitively a curved contour, as shown in FIG. 1, provide a very dense and reliable bond between the sheet 3 and padding 5.

Of course, various modifications may be brought to the specific form of embodiment of the invention shown and described herein, without, departing from the scope of the invention as set forth in the appended claims.

What I claim as new is:

1. A padded-dashboard structure for an automotive vehicle comprising:

- a rigid support plate of molded synthetic-resin material formed with a pair of planar portions separated by a ridge and having a broad surface on on side of said plate;
- a facing sheet of polyvinylchloride spaced from but substantially coextensive with said surface, said sheet having planar portions juxtaposed with the respective planar portions of said support plate and a ridge portion spaced from the ridge of said support plate by a distance greater than that separating the planar portions of the sheet and the plate, said sheet being formed substantially over the entire area of its side facing said surface with a surface array of discrete deflectible spaced-apart elongate cylindrical rounded-tip studs molded integrally with the remainder of the sheet perpendicular to the latter side and reaching toward said surface, said studs having a length less than the distance between said sheet and said plate over said portion of said sheet but greater than the distance between said planar portions of said sheet and said plate over the planar portions of said sheet whereby said studs are deflected against said plate at said planar portions of said sheet but terminate short of said surface over said rigid portion of said sheet, said studs all being of a length substantially greater than the thickness of said sheet in regions between said studs; and
- a padding layer of resilient cellular polyurethane case in situ between said sheet and said plate and filling the space between them while embedding said studs, said studs anchoring said sheet to said padding layer while enabling said layer and said sheet to undergo differential thermal expansion without mutual separation and tearing of said layer.

* * * * *